United States Patent [19]

Silvestri

[11] 4,215,534
[45] Aug. 5, 1980

[54] COOLING SYSTEM FOR AN EXPANDER ENGINE

[75] Inventor: Giovanni J. Silvestri, Barrington, R.I.

[73] Assignee: The United States of America as represented by the Secretary of the Navy, Washington, D.C.

[21] Appl. No.: 720,485

[22] Filed: Sep. 3, 1976

[51] Int. Cl.³ .............................................. F02B 53/06
[52] U.S. Cl. ................................ 60/39.63; 418/61 A; 418/83; 418/161
[58] Field of Search .................. 418/61 A, 61 B, 161, 418/83; 60/39.61, 39.63, 310

[56] References Cited

U.S. PATENT DOCUMENTS

| | | | |
|---|---|---|---|
| 3,007,460 | 11/1961 | Bentele et al. | 418/83 |
| 3,091,386 | 5/1963 | Paschke | 418/61 A |
| 3,687,578 | 8/1972 | White et al. | 418/61 B |
| 3,744,940 | 7/1973 | Pierce et al. | 418/61 A |
| 3,798,904 | 3/1974 | Gleason et al. | 60/310 |
| 4,015,424 | 4/1977 | Shinohara | 60/39.61 |

*Primary Examiner*—Robert E. Garrett
*Attorney, Agent, or Firm*—Richard S. Sciascia; Arthur A. McGill; Prithvi C. Lall

[57] ABSTRACT

A cooling system for a low noise, high power, light weight, compact rotary expander engine of the Wankel type having two hot zones at the operating temperatures wherein a coolant path is provided which permits the coolest coolant to be delivered at the two hottest points. This increases the heat transfer area exposed to the coolant and delivers and rejects the coolant with an absolute minimum of plumbing.

8 Claims, 7 Drawing Figures

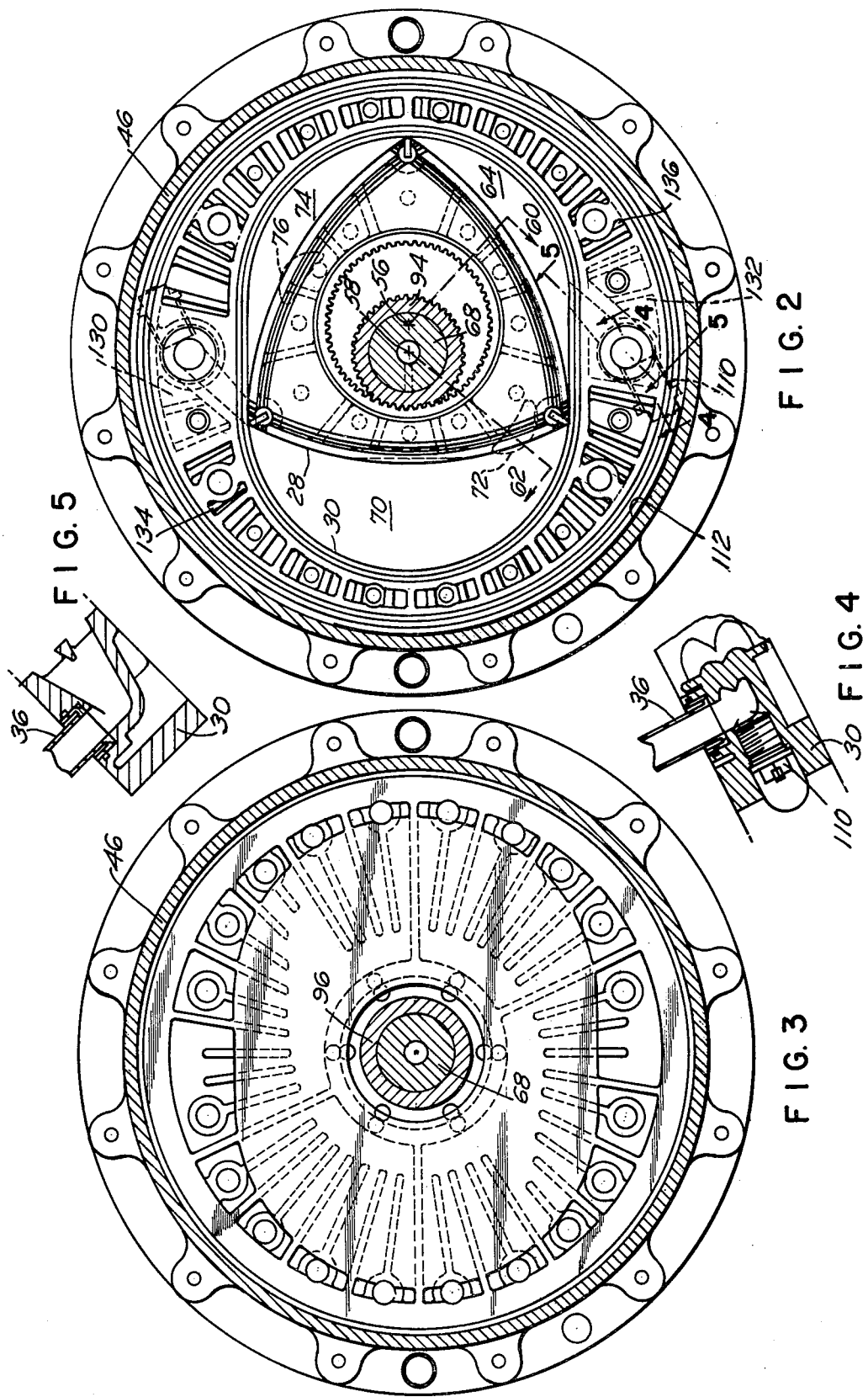

COOLING SYSTEM FOR AN EXPANDER ENGINE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This application is co-pending with my three other patent applications Ser. Nos. 720,313; 720,314, now U.S. Pat. No. 4,089,162; and 720,490, now abandoned and each having the same filing date of Sept. 3, 1976; and relating to a rotary expander engine of the Wankel type describing and claiming various aspects thereof.

This invention relates to an improved cooling system for rotary mechanisms, and more particularly to a cooling system for a rotary expander engine of the Wankel type.

The Wankel engine has been and is being developed as an internal combustion engine by various groups such as Wankel et al, NSU, Lonro, Curtiss-Wright Corporation, General Motors Corporation and Mazda Corporation among many others. Each group has addressed itself to the cooling system for controlling the temperatures of various parts of the engine and each is developing new or different cooling arrangements and techniques as dictated by different requirements.

The development and application of the Wankel geometry as a torpedo expander engine requires a different and unique solution to the cooling problem because as an expander it has two hot zones instead of one. Furthermore, the operating temperatures, pressures, densities and velocities of the working fluid are much higher than those of ordinary Wankel engine, resulting in higher heat transfer coefficients. Such an expander engine presents a more difficult cooling problem and it is desirable to have a cooling system which is suitable for a torpedo expander engine to meet the special problems encountered therein.

SUMMARY OF THE INVENTION

The cooling system for a low noise, high power, light weight and compact rotary expander engine of the Wankel type provides a coolant flow path which permits the coolest coolant to be delivered at the two points of the expander engine having the highest temperature. This flow path increases the velocity and turbulence of the coolant. Furthermore, it increases the heat transfer area exposed to the coolant. This particular flow path accomplishes delivering and rejecting of the coolant with the absolute minimum of plumbing.

An object of subject invention is to provide a cooling system for a low noise expander engine wherein the coolant provides the coolest coolant to be delivered to the two hottest points instead of one as is customarily the case in an internal combustion rotary engine.

Another object of subject invention is to provide a coolant flow path which increases the velocity of the coolant which is circulating in the engine.

Still another object of the subject invention is to provide a coolant flow path which increases the heat transfer area exposed to the coolant.

Still another object of subject invention is to provide a coolant flow path which requires minimum amount of plumbing for delivering and rejecting the coolant.

Other objects, advantages and novel features of this invention will become apparent from the following detailed description of the invention when considered in conjunction with the accompanying drawings wherein:

BRIEF DESCRIPTION OF THE DRAWINGS

FIG. 2 is a cross section of FIG. 1 taken along line 2—2;

FIG. 3 is a cross section along line 3—3 of FIG. 1;

FIG. 4 is a cross section along line 4—4 of FIG. 2;

FIG. 5 is a cross section along line 5—5 of FIG. 2;

DESCRIPTION OF A PREFERRED EMBODIMENT

Figure 1:
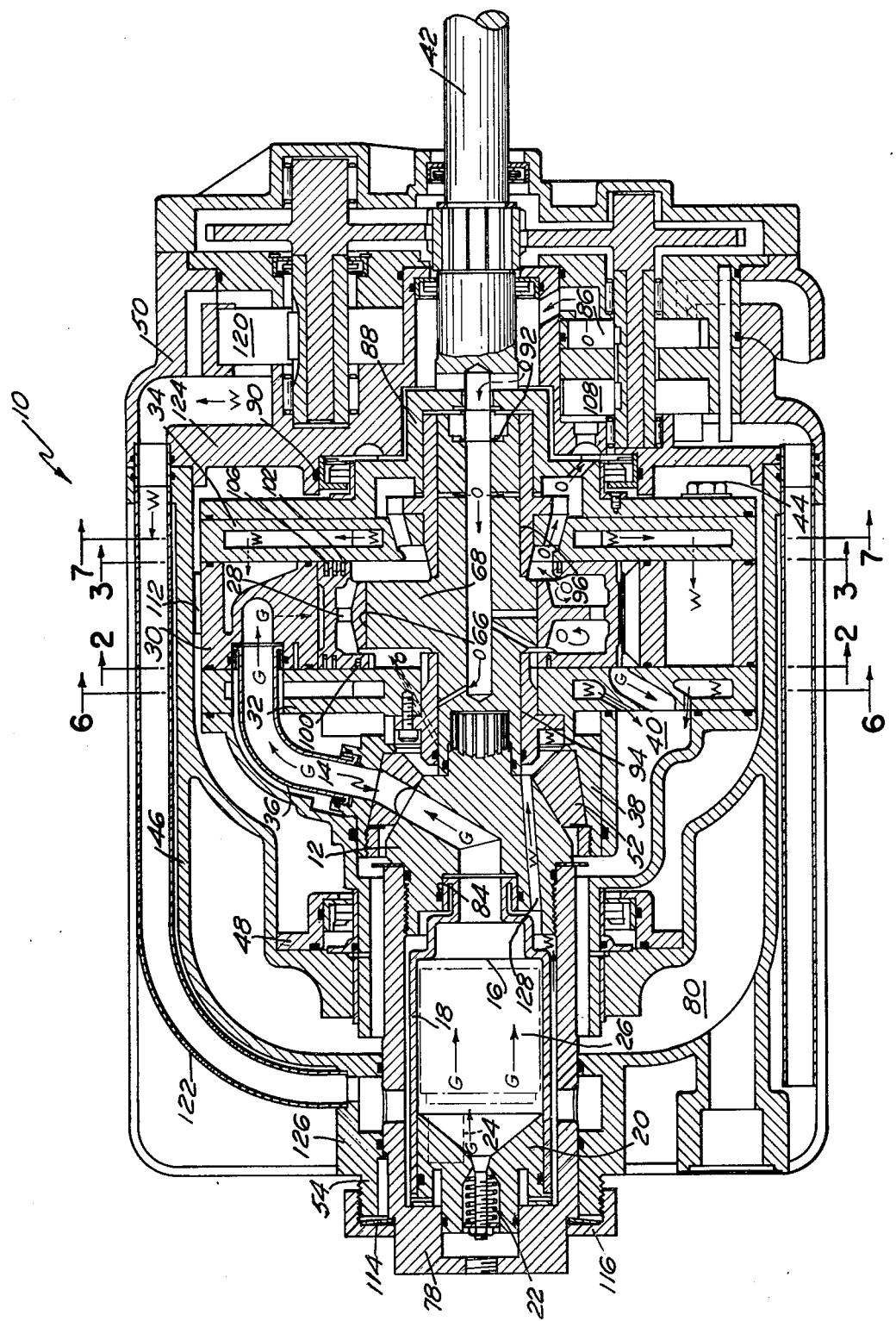
FIG. 1 is a multi-cross sectional view of an expander engine for which the cooling system is designed.
Figure 6:
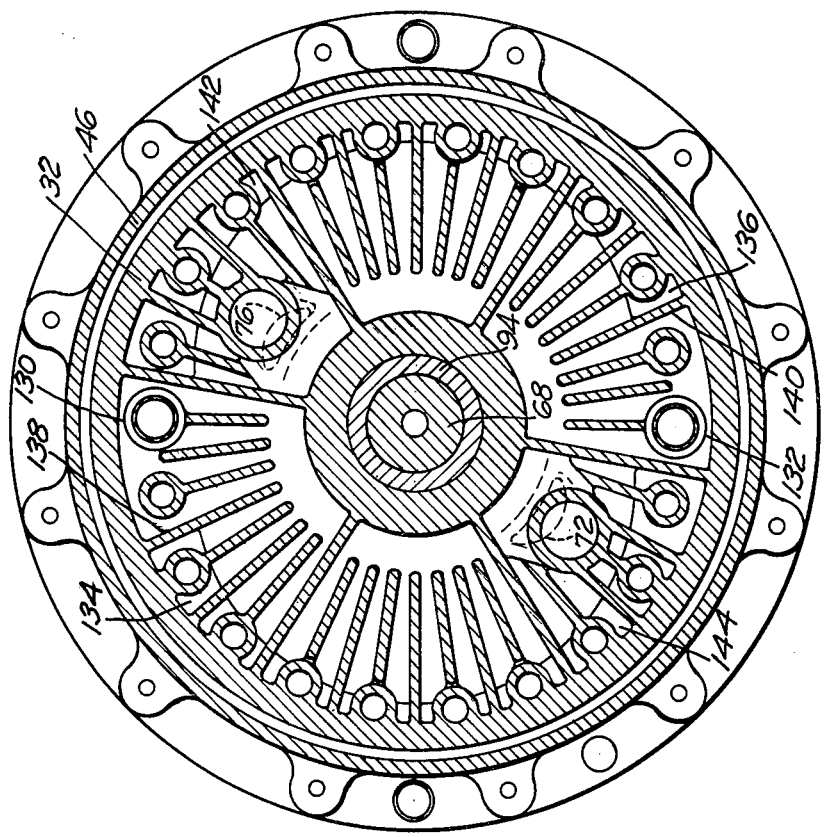
FIG. 6 is a cross section along line 6—6 of FIG. 1.
Figure 7:
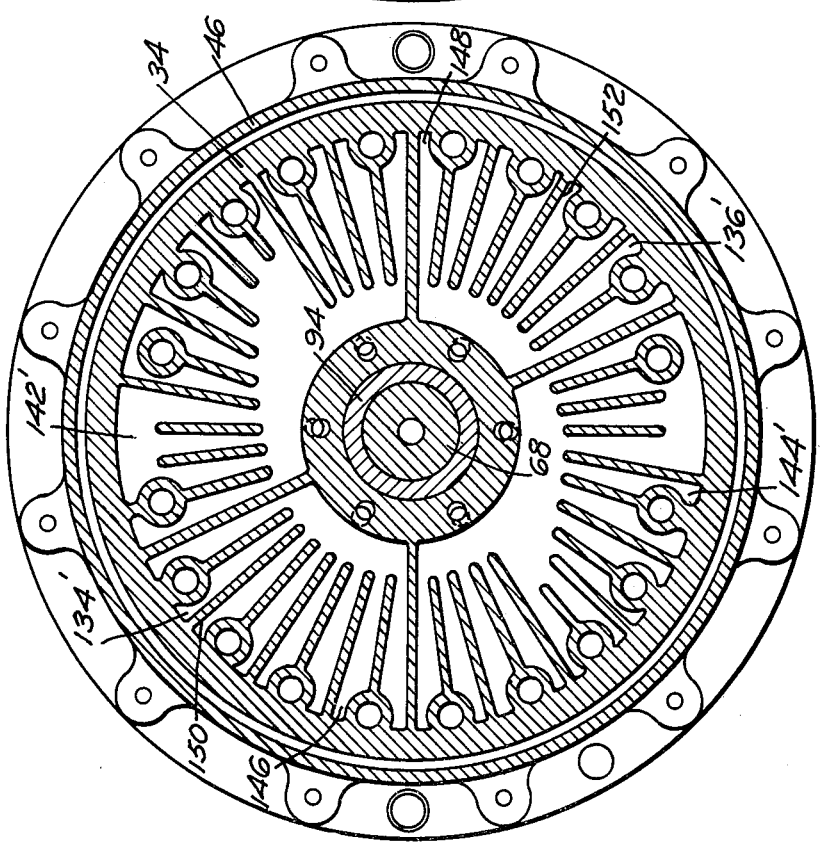
FIG. 7 is a cross section along 7—7 of FIG. 1.

Referring to the drawings wherein like reference characters designate like parts throughout the several views, and more particularly to FIG. 1 thereof, a multi-cross sectional view of an expander Wankel engine showing the cooling flow path is shown wherein the flow of cooling water is shown by arrows marked "W". The coolant, preferably cooling water, may be delivered from either an external source or from an integral water pump 120 in the support structure after-end 50 as shown in FIG. 1 through delivery pipes 122 to the inlet manifold or forward support structure 124. Water floods and flows through the annular space between combustion liner 18 and housing 126 of FIG. 1. The combustion chamber liner 18 is configured to permit the cooling water to surround the o-ring seal 84 at the downstream end so that the temperature of o-ring 84 never exceeds saturation temperature of the water and effectively seals extremely high temperature gases. This particular concept is described in greater detail in one of my three co-pending patent applications; Ser. No. 720,490, now abandoned filed Sept. 3, 1976. The water then flows through a multiple co-axial holes (one of which is shown as hole 128 in FIG. 1) in the male part 12 of valve 14 into a chamber formed by the surfaces of the valve block 38, the water and exhaust manifold assembly 40 and forward end-plate 32. The cooling water then enters the forward end-plate 32 at two diametrically opposite points around working fluid delivery pipes 36. These points are identified as 130 and 132 on end-plate 32 as shown in FIG. 6. The water then flows radially inward, turning about barrier ribs 138 and 140 and radially outward on end-plate 32 from points 130, 132 to points 134 and 136 respectively as shown in FIG. 6. Points 134 and 136 on end-plate 32 communicate with points 134' and 136' respectively on end-plate 34 of FIG. 7 via axial opening through chamber 30 as shown in FIGS. 1 and 2. The water then flows radially inward on end-plate 34, turning to barrier ribs 150 and 152 and radially outward to points 146 and 148 on end-plate 34. This path is continued ultimately on end-plate 32 through chamber 30 and on to end-plate 34 to points 142' and 144' which corresponds to points 142 and 144 respectively on plate 32. The water then ultimately discharges at the exhaust valves in chamber 40 where it mixes with exhaust gases and cools them. It flows from this point on is as explained in tracing the working fluid.

The water flow path as described allows for control of water velocity and surface areas by changing fin and flow areas for optimum wall temperature control as for a constant flow of cooling water, the velocity of the circulating water is inversely proportional to flow area.

It should be noted that the flow of working fluids and lubricating fluids are respectively designated by arrows marked by letters "G" and "O" on FIG. 1.

Briefly stated, a cooling system for an expander engine according to the teachings of subject invention provides the coolest coolant to the two hot zones. This increases heat transfer area to the coolant and delivers and rejects the coolant with very little plumbing.

Obviously many modifications and variations of the present invention are possible in the light of the above teachings. As an example, the position and size of the fins or ribs can be changed. Furthermore, a different coolant flow path may be provided. It is therefore understood within the scope of the appended claims the invention may be practiced otherwise than specifically described.

I claim:

1. In a rotary expander engine having a fixed housing with a stationary crankshaft, a housing chamber rotatable at a first speed, a rotor rotatable at a second speed and inlet valve having a stationary male part and rotatable female part being mounted in said fixed housing, O-rings for preventing gases from leaking from said housing chamber, and an improved cooling system which comprises:

a source of coolant being mounted in the support structure of said rotary expander engine;

a pair of generally parallel coolant flow path means for coolant to flow from the hottest points of said engine to the coolest points thereof; and means for controlling the velocity of the coolant and the temperature distribution inside said housing chamber.

2. The cooling system of claim 1 wherein said pair of generally parallel coolant flow path means includes a pair of pipes for carrying the coolant from said source of coolant around a combustion chamber and said housing chamber.

3. The cooling system of claim 1 wherein said means for controlling the velocity of the coolant and the temperature distribution inside said housing chamber includes a plurality of barrier ribs.

4. The cooling system of claim 8 which further includes a plurality of co-axial openings in said male part of said inlet valve for cooling various parts of said inlet valve.

5. The cooling system of claim 1 which further includes means for keeping the temperatures of O-rings of said expander engine within permissible working temperature.

6. The cooling device of claim 4 which further includes matching coolant paths in the forward and after end plates of the housing chamber.

7. The cooling device of claim 4 which further includes means for mixing exhaust gases and outflowing coolant to lower the temperature of the exhaust gases.

8. The cooling device of claim 7 which further includes a surge chamber in the exhaust manifold thereof, for reducing the noise due to said exhaust gases and outflowing coolant.

* * * * *